F. L. SESSIONS.
ELECTRICAL COLLECTING BRUSH STRUCTURE.
APPLICATION FILED JAN. 3, 1921.
1,433,852.
Patented Oct. 31, 1922.
3 SHEETS—SHEET 1.
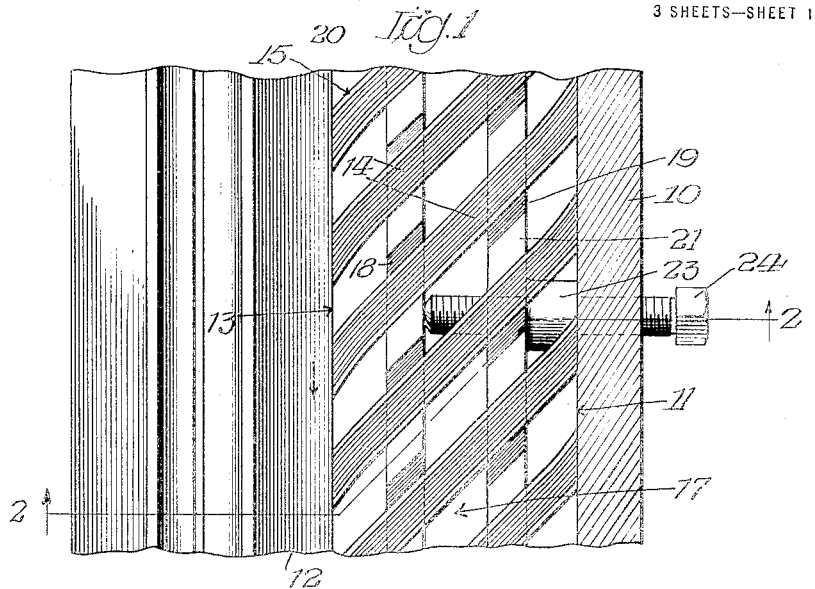
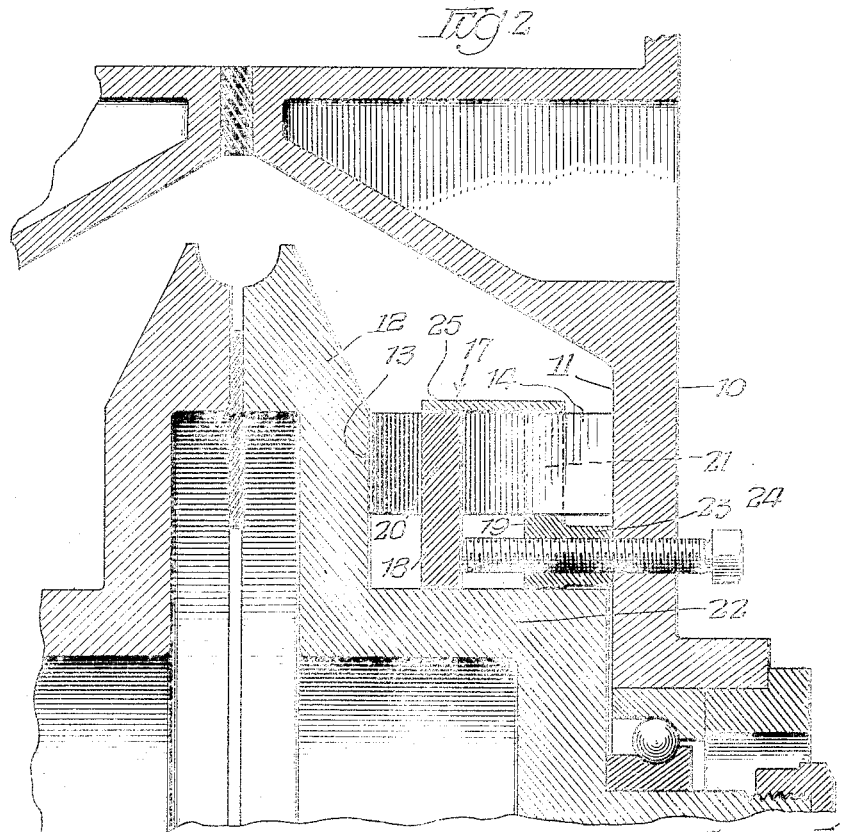

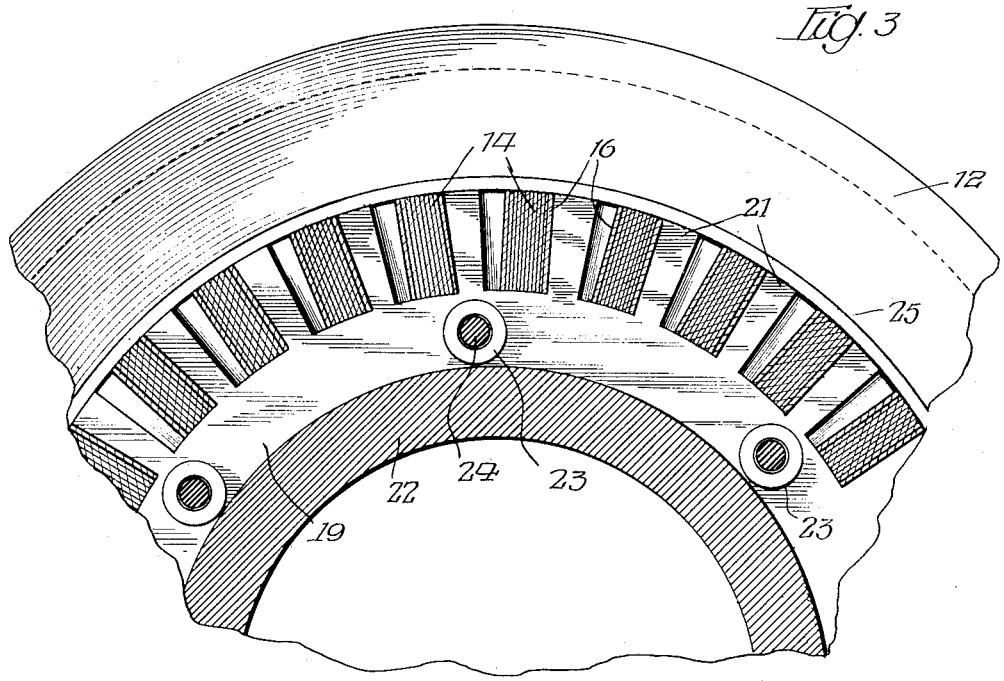
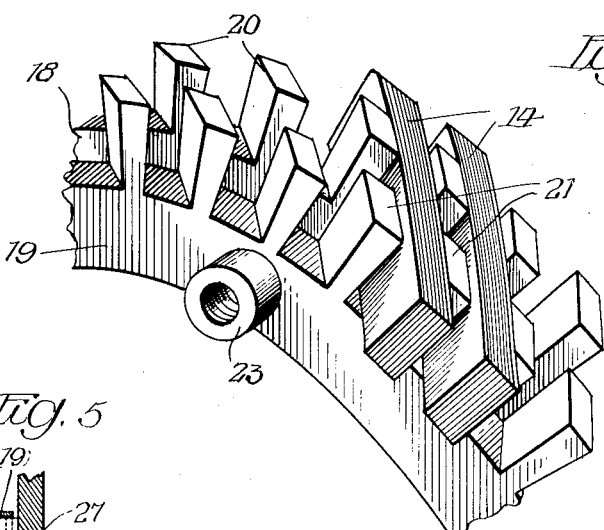
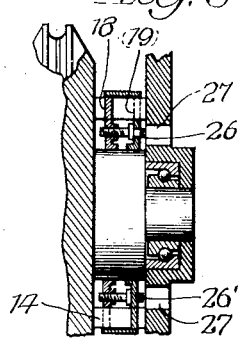

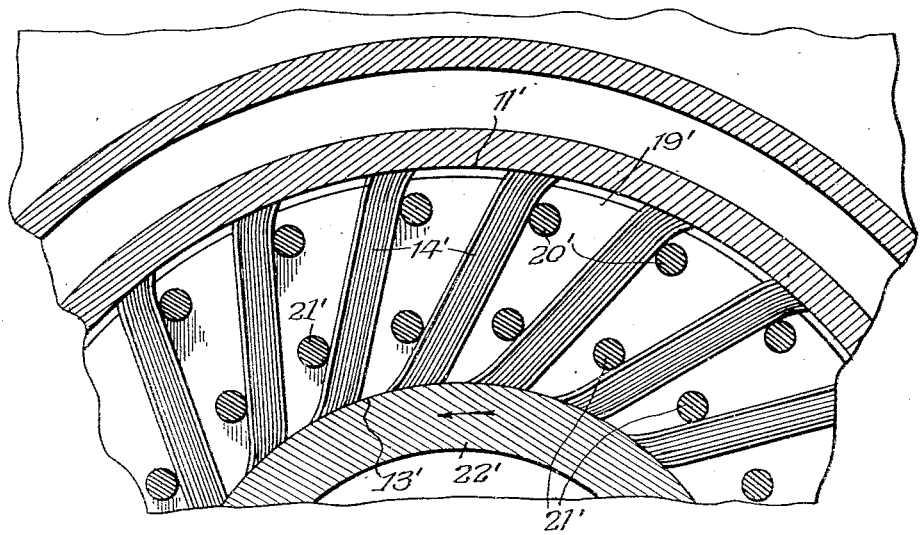
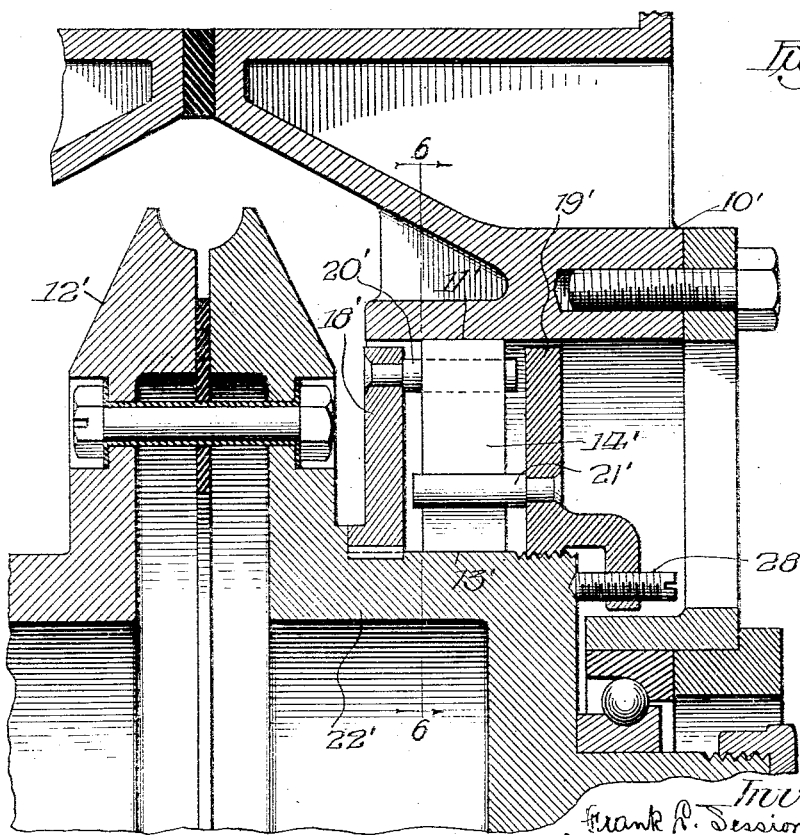

Patented Oct. 31, 1922.

1,433,852

UNITED STATES PATENT OFFICE.

FRANK L. SESSIONS, OF LAKEWOOD, OHIO, ASSIGNOR TO THE ELYRIA IRON & STEEL COMPANY, A CORPORATION OF OHIO.

ELECTRICAL COLLECTING-BRUSH STRUCTURE.

Application filed January 3, 1921. Serial No. 434,706.

*To all whom it may concern:*

Be it known that I, FRANK L. SESSIONS, a citizen of the United States, residing at Lakewood, in the county of Cuyahoga and State of Ohio, have invented certain new and useful Improvements in Electrical Collecting-Brush Structures, of which the following is a specification.

In machines requiring that electric current of large volume be conducted from one to another of two relatively movable machine parts as, for one example, from the immovable secondary terminal of an electric transformer to a rotatable electrode, in a welding machine—great difficulty is encountered in securing and maintaining adequate electrical connection between the two relatively movable parts for avoidance of the excessive "voltage drop" or waste of energy, and burning, blistering and pitting of the contacting parts that are concomitant of poor connections.

The object of my invention is to provide an improved electric-brush structure for use under such conditions, that will advantageously minimize wastage of energy, decrease the cost of initial construction and subsequent maintenance, increase the life of the brushes and facilitate adjustment of the brushes constantly to maintain adequate electrical connection between the machine parts until the brushes are worn out.

In the accompanying drawings I have shown embodiments of my invention for effecting electrical connection between the distributing surface of a relatively stationary machine element—specifically a secondary terminal of an electric-transformer adapted to supply current of high amperage and low voltage—and the collecting surface of a rotatable element—specifically a roller electrode of a tube-welding machine—but it will be understood that my invention is applicable to other environments.

In the drawings, Fig. 1 is an isometric plan view of a fragment of a collector-brush structure embodying my invention; Fig. 2 is a section on line 2—2 of Fig. 1; Fig. 3 is a fragmentary end view; Fig. 4 is a perspective detail; Fig. 5 is a sectional view of a modified embodiment; Fig. 6 is a section on line 6—6 of Fig. 7 showing another modified embodiment of my invention, and Fig. 7 is a central vertical section thereof.

It will be understood that in illustrating two forms of construction embodying my invention I do not seek to exhaust the changes that may be wrought, but rather to indicate that various specific constructions may be provided within the spirit and teachings of my invention.

In general I provide, between confronting surfaces of the two machine parts to be electrically connected an annular series of brushes, each brush being somewhat springy and being longer than the shortest distance between the confronting surfaces and for these brushes I provide positioning and tensioning means acting to spring them into contact at their ends with both of the confronting surfaces. These brushes may be disposed in the space between the confronting surfaces at an angle to both thereof, and are positioned in said space preferably by rings that have studs to bear against the respective brush members between the ends thereof and that are relatively adjustable to vary the tension under which both ends of the brush members are forced into spring-contact with the respective confronting machine surfaces.

First to describe the construction shown in Figs. 1 to 4, 10 indicates a relatively stationary conductor, specifically the secondary terminal of a transformer, that presents in a vertical plane an annular contact surface or a distributing surface 11, and 12 indicates a relatively rotatable conductor, specifically a roller electrode finding bearing in said part 10, that has in a vertical plane an annular collector surface 13 confronting the surface 11. The brushes 14, longer than the distance between the opposed contact surfaces may be constructed in various ways conformably with commutator-brush practice, each brush, in the form shown, consisting of a bundle of thin copper laminæ flanked by a spring-strip 16 of phosphor bronze to give each brush a resilient quality. These brush bundles are loosely laid in a brush-holder, generally indicated at 17, so that the ends of the laminæ may adjust themselves to present a beveled effect for proper conformity to the opposed surfaces 11, 13 with which they contact. The brush holder 17 is made up with two relatively adjustable rings 18 and 19 which are respectively provided with stud series 20 and 21 to position the brushes, in this case, horizontally. These studs are so arranged that those of one series bear against the brush members on one face near one end of the brushes, while the studs of the other series bear against the other side of the brushes near the other end thereof, the relative adjustability of the two ring members being such that the pressure of the brushes upon the contact surfaces may be varied and the rings may be relatively fixed in adjusted position. Thus, as shown in Fig. 1, inner ring 18 may be loosely mounted on the hub portion 22 of electrode 12 and the outer ring 19, loosely surrounding said hub, may have spaced bosses 23 to bear against the surface 11 of the transformer terminal, set screws 24 threaded through the stationary terminal 10 and through the bosses 23 of ring 19 and bearing against the outer side of ring 18, serving both to hold the ring structure against rotation and to provide accessible means for relative adjustment of the two ring members. It will be noted that the changing of the distance between the two rings, effected by turning screw 24, will vary the tension on the brushes, so that wear on the brush ends may easily be compensated for until the extreme range of adjustment of the inner ring is reached. Since the rings are radially slotted to provide the radial stud-series thereon, and the brush-laminæ are merely loosely laid in the slot, it is desirable to provide a retaining band 25 tightly fitted on the periphery of ring 19 and loosely encircling the relatively adjustable ring 18.

If desired both rings may be loose, or rotatable, with respect to both of the contact surfaces of the machine, a simple construction to this end being shown in Fig. 5 wherein the screws 26 and 26' are mounted to turn smoothly in the outer ring 19 and to make threaded engagement with the inner ring 18, the part 10 being provided with openings 27 to give access to the screw heads.

Figs. 6 and 7 show a construction which indicates that relative adjustment between the ring members of the brush holder may be circumferential rather than lateral; that the brush holder structure may be fixed if desired to the relatively rotatable machine element, and that the brushes may be disposed in generally radial arrangement between cylindrical confronting surfaces of the machine. Specifically the brushes 14', set at an angle to radial between the cylindrical contact surfaces 11' and 13' of the transformer terminal and the roller electrode, are acted upon by studs 20' and 21' projecting horizontally from the respective confronting surfaces of parallel vertically disposed ring members, inner ring 18' being fixed to the hub 22' and the outer ring 19' being rotatable on said hub and adapted to be fixed in position relative thereto by a set screw 28 engaging the end of the hub, ring 19' and the hub being preferably threaded together so that by tightening the set screw 28 the rotative adjustment of the outer ring relative to the inner ring will be fixed.

I claim:

1. The combination of opposed, smooth, relatively movable contact surfaces of a machine and a plurality of brush members each making spring-contact at its opposite ends respectively with said opposed contact surfaces.

2. In combination, two relatively movable machine parts presenting opposed, smooth, contact surfaces, a plurality of brush members each longer than the space between said opposed surfaces and making spring-contact at its opposite ends respectively with said surfaces, and means for variably tensioning said brushes in unison.

3. In combination, two relatively movable machine elements adapted to carry heavy current, and providing opposed, smooth, contact surfaces, a plurality of brush members disposed in the space between said elements each arranged to make spring-contact at its opposite ends respectively with the opposed contact surfaces of said elements, and a brush holder comprising parts relatively adjustable to vary the tension of said brushes.

4. In combination, two relatively movable machine elements adapted to carry heavy current, and providing opposed, smooth, contact surfaces, a plurality of brush members disposed in the space between said elements each arranged to make end contact only with both of the opposed contact surfaces of said elements, and a brush holder comprising a pair of rings having studs to position the brushes, and means for relatively adjusting said rings to tension the brushes.

5. The combination with two relatively movable machine parts presenting opposed contact surfaces, of a plurality of brush members each longer than the space between said opposed surfaces, and brush-positioning means acting on said brush members between their ends to spring the opposite ends of said brush members into contact with the respective opposed surfaces.

6. The combination with two relatively movable machine parts presenting opposed contact surfaces, of a laminated brush comprising members each longer than the space between said opposed surfaces, and means acting on said brush between its ends to bend the members and spring the ends thereof respectively into contact with said opposed surfaces.

7. The combination with two relatively movable machine parts presenting opposed contact surfaces, of a laminated brush structure comprising a plurality of members each longer than the space between said opposed surfaces, and brush-positioning and tensioning means providing two relatively movable parts acting on said brush between the ends thereof to bend the brush members and spring the opposite free end portions thereof respectively into contact with said opposed contact surfaces.

8. The combination of opposed, relatively movable contact surfaces, a plurality of brush members each having both ends free, and means for springing both ends of each said brush member into contact with the respective opposed contact surfaces.

9. The combination with two relatively movable machine parts presenting separated contact surfaces, of a plurality of brush members bearing upon both of said surfaces and spanning the space between them, and adjustable means for varying the contact pressure of said brush members upon said surfaces.

10. The combination with two relatively movable machine parts presenting separate contact surfaces, of a plurality of laminated brush members having edge contact with both of said contact surfaces and means for varying the contact pressure of said brush members upon said surfaces.

11. The combination with two relatively movable machine parts presenting separate contact surfaces, of a plurality of laminated brush members having edge contact with both of said contact surfaces and means for varying the contact pressure of said brush members upon both said surfaces simultaneously.

12. The combination of two relatively movable machine parts presenting parallel, opposed surfaces, of a brush member disposed between said surfaces, said brush member being longer than the distance between said surfaces and inclined to them, and means for pressing said brush into contact with said surfaces by varying its angle of inclination thereto.

13. The combination of two relatively movable machine parts presenting parallel, opposed contact surfaces, of a plurality of brush members disposed between said surfaces, said brush members being longer than the distance between said surfaces and inclined to them, and means for simultaneously pressing said brushes into contact with one of said surfaces by varying their angle of inclination thereto.

14. The combination of two relatively movable machine parts presenting parallel, opposed contact surfaces, of a plurality of brush members disposed between said surfaces, said brush members being longer than the distance between said surfaces and inclined to them, and means acting on said brush members between their ends for simultaneously pressing said brushes into end contact with both of said surfaces by varying their angle of inclination thereto.

FRANK L. SESSIONS.